(12) United States Patent
Lin et al.

(10) Patent No.: US 10,495,846 B2
(45) Date of Patent: Dec. 3, 2019

(54) ULTRA-WIDE-ANGLE AND LARGE-APERTURE OPTICAL LENS ASSEMBLY WITH HIGH IMAGE QUALITY

(71) Applicant: GUANGDONG XUYE OPTOELECTRONICS TECHNOLOGY CO., LTD, Dongguan, Guangdong (CN)

(72) Inventors: Xiaoyi Lin, Guangdong (CN); Zhengchao Yuan, Guangdong (CN); Liangjun Deng, Guangdong (CN)

(73) Assignee: GUANGDONG XUYE OPTOELECTRONICS TECHNOLOGY CO., LTD, Dongguan, Guangdong (CN)

( * ) Notice: Subject to any disclaimer, the term of this patent is extended or adjusted under 35 U.S.C. 154(b) by 150 days.

(21) Appl. No.: 15/558,175

(22) PCT Filed: Apr. 29, 2015

(86) PCT No.: PCT/CN2015/077759
§ 371 (c)(1),
(2) Date: Sep. 13, 2017

(87) PCT Pub. No.: WO2016/145722
PCT Pub. Date: Sep. 22, 2016

(65) Prior Publication Data
US 2018/0074288 A1    Mar. 15, 2018

(30) Foreign Application Priority Data
Mar. 18, 2015    (CN) .......................... 2015 1 0119950

(51) Int. Cl.
*G02B 9/34*    (2006.01)
*G02B 13/06*    (2006.01)
(Continued)

(52) U.S. Cl.
CPC ................ *G02B 9/34* (2013.01); *G02B 13/06* (2013.01); *G02B 13/18* (2013.01); *G02B 27/0961* (2013.01)

(58) Field of Classification Search
CPC .......... G02B 9/34; G02B 13/06; G02B 13/18; G02B 27/0961
(Continued)

(56) References Cited

U.S. PATENT DOCUMENTS

2012/0113529 A1    5/2012 Ko
2013/0265652 A1    10/2013 An et al.
(Continued)

FOREIGN PATENT DOCUMENTS

CN    103123414 A    5/2013
CN    103913820 A    7/2014
(Continued)

OTHER PUBLICATIONS

International Search Report for PCT/CN2015/077759, dated Dec. 14, 2015, ISA/CN.
(Continued)

*Primary Examiner* — Wen Huang
(74) *Attorney, Agent, or Firm* — Yue (Robert) Xu; Apex Attorneys at Law, LLP

(57) ABSTRACT

An ultra-wide-angle and large-aperture optical lens assembly with a high image quality is provided, including: a first lens, a second lens, a third lens, a fourth lens, and a filter which are arranged sequentially from an object side to an image side, and a diaphragm arranged between the second lens and the object side. The first lens has a positive focal power and includes a convex surface facing toward the image side. The second lens has a negative focal power and includes a concave surface facing toward the object side. The third lens has a positive focal power. The fourth lens has
(Continued)

a negative focal power and has an object side surface and an image side surface both being aspheric surfaces, the object side surface of the fourth lens is arranged with an inflexion point. The lens assembly meets the relational expressions: $0.9<TTL/f1<2.5$, $0.5<f/|f4|<1.6$, and $0.4<D4/D1<0.9$.

10 Claims, 11 Drawing Sheets

(51) Int. Cl.
    *G02B 13/18*     (2006.01)
    *G02B 27/09*     (2006.01)

(58) Field of Classification Search
    USPC ........................................................ 359/586
    See application file for complete search history.

(56) References Cited

U.S. PATENT DOCUMENTS

| | | |
|---|---|---|
| 2014/0055663 A1 | 2/2014 | Chang |
| 2014/0132829 A1 | 5/2014 | Chen |
| 2014/0185151 A1* | 7/2014 | Chen .................... G02B 13/004 359/773 |
| 2015/0146308 A1 | 5/2015 | Yuza |
| 2015/0378129 A1 | 12/2015 | Yuza |
| 2016/0011397 A1* | 1/2016 | Chiang ................ G02B 13/004 359/715 |

FOREIGN PATENT DOCUMENTS

| | | |
|---|---|---|
| CN | 204101804 U | 1/2015 |
| CN | 104330877 A | 2/2015 |
| CN | 204178038 U | 2/2015 |
| CN | 204496092 U | 7/2015 |
| JP | 2009145597 A | 7/2009 |
| TW | 201329494 A | 7/2013 |
| WO | 2013058534 A1 | 4/2013 |

OTHER PUBLICATIONS

The 1st Office Action regarding Chinese Patent Application No. CN201510119950.0, dated Aug. 3, 2016. English Translation Provided.

* cited by examiner

US 10,495,846 B2

ULTRA-WIDE-ANGLE AND LARGE-APERTURE OPTICAL LENS ASSEMBLY WITH HIGH IMAGE QUALITY

This application is the national phase of International Patent Application No. PCT/CN2015/077759 filed on Apr. 29, 2015, which claims priority to Chinese Patent Application No. 201510119950.0, titled "ULTRA-WIDE-ANGLE AND LARGE-APERTURE OPTICAL LENS ASSEMBLY WITH HIGH IMAGE QUALITY", filed with the Chinese State Intellectual Property Office on Mar. 18, 2015, both of which are incorporated by reference in their entireties herein.

FIELD

The present disclosure relates to the technical field of optical lens, and particularly to an ultra-wide-angle and large-aperture optical lens assembly with high image quality.

BACKGROUND

Nowadays, science and technology are developed rapidly. With the increasing number of functions of various digital products, the requirement on image quality of a photo is higher. In more than a decade since 2000 in which a mobile phone with a camera was born, a camera function has been gradually developed for mobile phones and become mature. Taking pixels as an example, the lens has been changed from the original lens with several hundred thousands of pixels to the current mainstream lens with millions pixels, thereby gradually improving the image quality. On the other hand, with the continuous requirement for slimness of mobile terminals, the camera module of a mobile phone or a tablet computer is continuously miniaturized and thinned. Therefore, how to ensure a high image quality while satisfying miniaturization becomes a difficult problem to be solved in designing mobile phone lens currently.

SUMMARY

In order to solve the above problem, an ultra-wide-angle and large-aperture optical lens assembly with high image quality is provided according to the present disclosure, with which high image quality is ensured while satisfying miniaturization. Specifically, with a proper lens structure and a proper lens layout, light passing through the lens is smoothed and an aberration is reasonably corrected, and an aberration of an off-axis field of view can be further corrected. Therefore, a captured picture has low image distortion and high definition, thereby ensuring the captured picture to be clear, colorful and rich in sense of hierarchicy.

The technical solution adopted in the present disclosure is that, the ultra-wide-angle and large-aperture optical lens assembly with high image quality includes a first lens, a second lens, a third lens, a fourth lens, and a filter which are sequentially arranged from the object side to an image side, and a diaphragm arranged between the second lens and an object side. The first lens has a positive focal power and includes a convex surface facing toward the image side. The second lens has a negative focal power and includes a concave surface facing toward the object side. The third lens has a positive focal power. The fourth lens has a negative focal power and has an object side surface and an image side surface both being aspheric surfaces, and the object side surface of the fourth lens is arranged with an inflexion point. The lens assembly meets the following relational expressions: $0.9<TTL/f1<2.5$, $0.5<f/|f4|<1.6$, and $0.4<D4/D1<0.9$, where, f is a focal length of the lens assembly, f1 is a focal length of the first lens, f4 is a focal length of the fourth lens; D1 is a thickness of the first lens on an optical axis, D4 is a thickness of the fourth lens on the optical axis, and TTL is a total length of the lens assembly.

A further improvement to the above technical solution may be that, a radius of curvature, R4, of an image side surface of the second lens and the focal length f of the lens assembly meet the following relational expression: $-1.2<R4/f<-1.8$.

A further improvement to the above technical solution may be that, a distance T12 between the first lens and the second lens on the optical axis and a distance T23 between the second lens and the third lens on the optical axis meet the following relational expression: $T12/T23<1$.

A further improvement to the above technical solution may be that, the Abbe numbers Vdn of the first lens, the second lens, the third lens and the fourth lens meet the following relational expression: $(Vd1+Vd3)/(Vd2+Vd4)>2$.

A further improvement to the above technical solution may be that, a refractive index n1 of the first lens and a refractive index n2 of the second lens meet the following relational expression: $1.5<n1<1.6<n2<1.7$.

Compared with conventional technologies, the ultra-wide-angle and large-aperture optical lens assembly with high image quality according to the present disclosure has the following advantages.

1) The optical lens is designed for current digital products having high-pixel cameras, which has features of ultra-wide-angle, large-aperture and high image quality. The lens assembly has a field angle up to 80 or more degrees for capturing more scenes, and a large aperture of 2.0 for increasing the amount of incoming light for photographing, so as to obtain a bright picture and improve a photography effect at night.

2) In the lens assembly, the first lens has the positive focal power, the second lens has the negative focal power, the third lens has the positive focal power and the fourth lens has the negative focal power. With such structure with the positive focal powers and the negative focal powers arranged alternately, light passing through the lenses is smoothed and an aberration is reasonably corrected.

3) The object side surface of the fourth lens is arranged with the inflexion point. In this case, off-axis lights may be aggregated effectively, thus their angles of incidence on light sensitive elements are more consistent with angles preset in the chip and the aberration of an off-axis field of view can be further corrected. Meanwhile, a center of the fourth lens is substantially flushed with an edge thereof, thereby avoiding stray light caused by a raised center.

4) The optical lens assembly has an optical distortion less than 2%, a field curvature less than 0.1 mm and a spherical aberration less than 0.1 mm. Therefore, a captured picture has low image distortion and high definition, thereby ensuring the captured picture to be clear, colorful and rich in sense of hierarchy.

In view of the above, the lens assembly provided can ensure a high image quality while satisfying miniaturization.

DETAILED DESCRIPTION

The present disclosure is further described in conjunction with the drawings hereinafter.

First Embodiment

Figure 1:
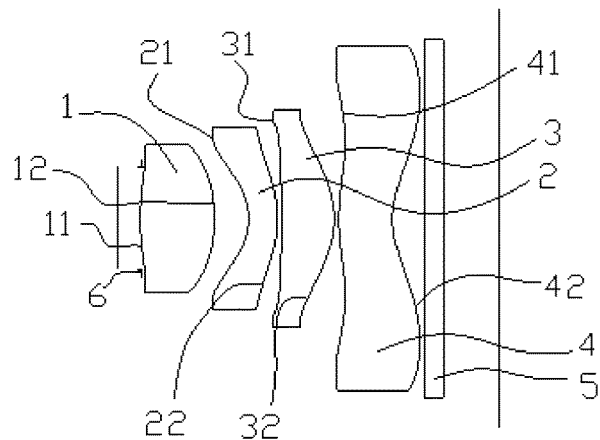
FIG. 1 is a schematic structural diagram of an ultra-wide-angle and large-aperture optical lens assembly with high image quality according to a first embodiment of the present disclosure.

Referring to FIG. 1, an ultra-wide-angle and large-aperture optical lens assembly with high image quality according to the present disclosure is formed by 4 plastic (resin) lenses, including a first lens 1, a second lens 2, a third lens 3, a fourth lens 4, and a filter 5 which are arranged sequentially from an object side to an image side, and a diaphragm 6 arranged between the second lens 2 and the object side. The first lens 1 has a positive focal power and includes a convex surface facing toward the image side. The second lens 2 has a negative focal power and includes a concave surface facing toward the object side. The third lens 3 has a positive focal power. The fourth lens 4 has a negative focal power and has an object side surface and an image side surface both being aspheric surfaces, and the object side surface of the fourth lens 4 is arranged with an inflexion point.

The lens assembly, the first lens 1, the second lens 2, the third lens 3 and the fourth lens 4 meet the following relational expressions: 0.9<TTL/f1<2.5, 0.5<f/|f4|<1.6, 0.4<D4/D1<0.9 and 1.5<n1<1.6<n2<1.7.

In the relational expressions, f is a focal length of the lens assembly, f1 is a focal length of the first lens 1, f4 is a focal length of the fourth lens 4, D1 is a thickness of the first lens 1 on an optical axis, D4 is a thickness of the fourth lens 4 on the optical axis, TTL is a total length of the lens assembly, n1 is a refractive index of the first lens 1 and n2 is a refractive index of the second lens 2.

In the embodiment, the central thickness of the first lens 1 ranges from 0.735 mm to 0.945 mm, the central thickness of the second lens 2 ranges from 0.256 mm to 0.484 mm, the central thickness of the third lens 3 ranges from 0.512 mm to 0.733 mm and the central thickness of the fourth lens 4 ranges from 0.486 mm to 0.615 mm.

Moreover, aspheric surfaces of the first lens 1, the second lens 2, the third lens 3 and the fourth lens 4 meet the following formula:

$$z = \frac{cr^2}{1+\sqrt{1-(1+k)c^2r^2}} + \alpha_1 r^2 + \alpha_2 r^4 + \alpha_3 r^6 + \alpha_4 r^8 + \alpha_5 r^{10} + \alpha_6 r^{12} + \alpha_7 r^{14} + \alpha_8 r^{16},$$

where, z represents a z-axis coordinate value of any point on a lens surface, r represents a y-axis coordinate value of the point on the lens surface, c represents a reciprocal of a radius of curvature, R, of the lens surface, k is a cone coefficient, and $\alpha_1$, $\alpha_2$, $\alpha_3$, $\alpha_5$, $\alpha_7$ and $\alpha_8$ are high order aspherical coefficients.

The lens assembly may be further configured based on specific values of the parameters in the above formula, and the exemplary values are as shown in Table 1 (F=2.49 mm, FNO=2.0 and FOV=84°).

second lens 2, n1 is a refractive index of the first lens 1 and n2 is a refractive index of the second lens 2.

In the embodiment, the central thickness of the first lens 1 ranges from 0.535 mm to 0.745 mm, the central thickness of the second lens 2 ranges from 0.256 mm to 0.484 mm, the central thickness of the third lens 3 ranges from 0.612 mm to 0.833 mm, the central thickness of the fourth lens 4 ranges from 0.386 mm to 0.515 mm.

TABLE 1

Table of lens parameters of the lens assembly

| | The first lens 1 | | The second lens 2 | | The third lens 3 | | The fourth lens 4 | |
|---|---|---|---|---|---|---|---|---|
| | Surface sequence number | | | | | | | |
| | 11 | 12 | 21 | 22 | 31 | 32 | 41 | 42 |
| R (mm) | 2.63E+00 | −1.75E+00 | −6.73E−01 | −1.26E+00 | −4.62E+00 | −9.62E−01 | 2.16E+00 | 8.92E−01 |
| k | −3.30E+00 | 0 | −5.41E−01 | −1.67E+00 | 0 | −2.26E+00 | −3.00E+01 | −5.09E+00 |
| $\alpha_2$ | −8.98E−02 | −1.59E−01 | 1.28E−01 | 9.71E−02 | 2.05E−01 | 6.91E−02 | 2.69E−02 | −6.83E−02 |
| $\alpha_3$ | −2.15E−02 | −3.23E−01 | 7.98E−01 | 1.69E−01 | −1.75E−01 | 4.11E−02 | −2.04E−01 | −3.29E−04 |
| $\alpha_4$ | −2.78E−01 | 1.12E+00 | 5.82E−02 | −2.29E−01 | −7.33E−02 | −1.41E−01 | 1.50E−01 | 7.61E−03 |
| $\alpha_5$ | −4.03E−02 | −1.57E+00 | −8.89E−01 | 8.59E−02 | 1.69E−01 | 1.40E−01 | −2.90E−02 | −1.75E−03 |
| $\alpha_6$ | −4.06E−01 | 7.93E−01 | 7.85E−01 | 7.95E−03 | −8.48E−02 | −4.02E−02 | −1.17E−02 | −3.90E−04 |
| $\alpha_7$ | 0 | 0 | 0 | 0 | 0 | 0 | 6.44E−03 | 2.05E−04 |
| $\alpha_8$ | 0 | 0 | 0 | 0 | 0 | 0 | −9.13E−04 | −2.36E−05 |

Figure 2:
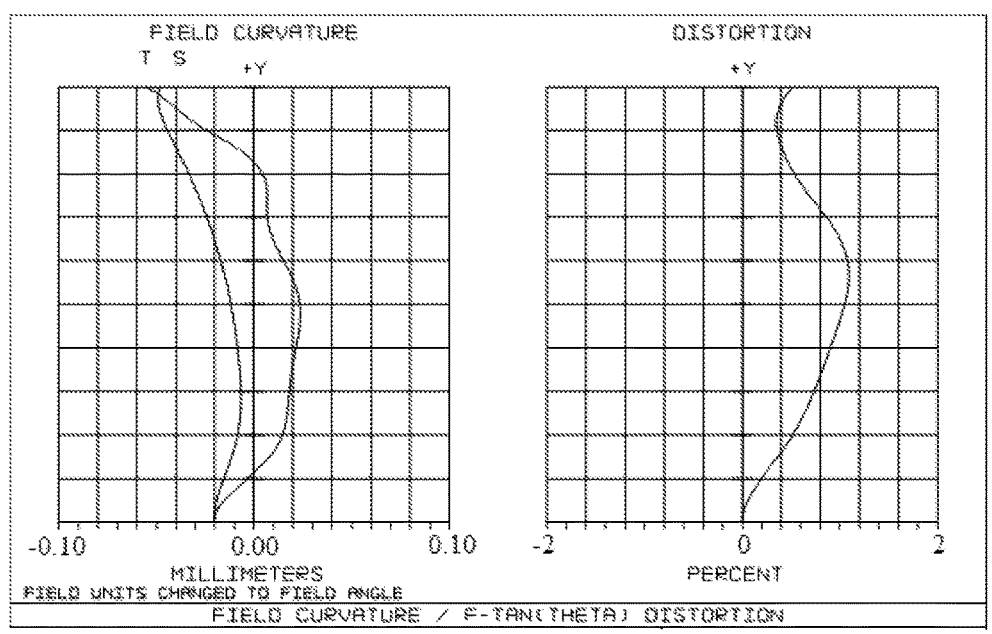
FIG. 2 shows field curvature curves and a distortion curve of the ultra-wide-angle and large-aperture optical lens assembly with high image quality according to the first embodiment of the present disclosure.
Figure 3:
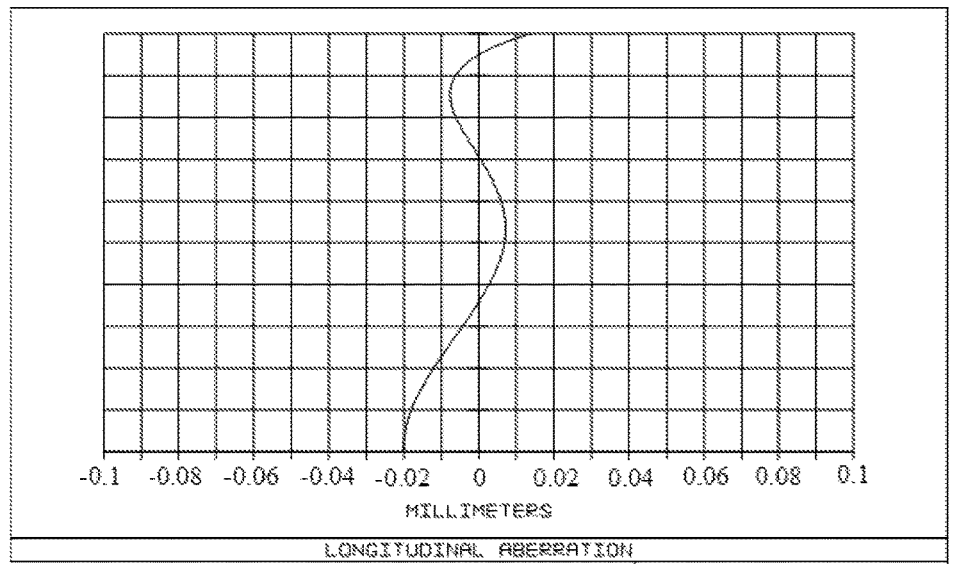
FIG. 3 shows a spherical aberration curve of the ultra-wide-angle and large-aperture optical lens assembly with high image quality according to the first embodiment of the present disclosure.

Based on the above parameters, the field curvature curve and distortion curve of the lens assembly are as shown in FIG. 2, and a spherical aberration curve of the lens assembly is as shown in FIG. 3. It can be seen from FIG. 2 that an optical distortion of the lens assembly is less than 2% and a field curvature of the lens assembly is less than 0.1 mm. Thus, a captured picture has low image distortion and high definition. It can be seen from FIG. 3 that the spherical aberration of the lens assembly is less than 0.1 mm.

Second Embodiment

Figure 4:
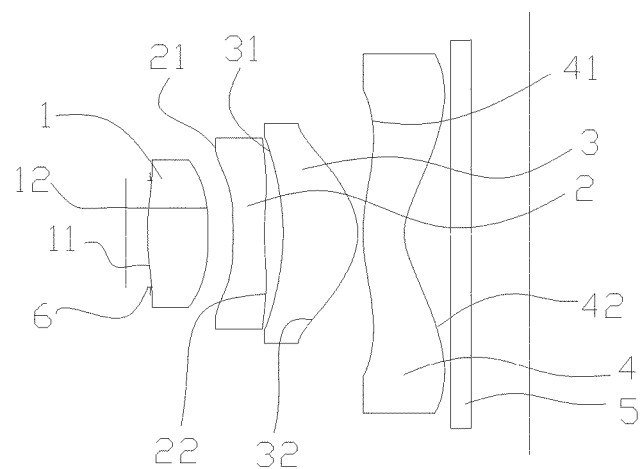
FIG. 4 is a schematic structural diagram of an ultra-wide-angle and large-aperture optical lens assembly with high image quality according to a second embodiment of the present disclosure.

Reference is made to FIG. 4. The second embodiment differs from the first embodiment in that, in the ultra-wide-angle and large-aperture optical lens assembly with high image quality, the lens assembly, the first lens 1, the second lens 2, the third lens 3 and the fourth lens 4 meet the following relational expressions: 0.9<TTL/f1<2.5, 0.5<f/|f4|<1.6, 0.4<D4/D1<0.9, −1.2<R4/f<−1.8 and 1.5<n1<1.6<n2<1.7.

In the relational expressions, f is a focal length of the lens assembly, f1 is a focal length of the first lens 1, f4 is a focal length of the fourth lens 4, D1 is a thickness of the first lens 1 on an optical axis, D4 is a thickness of the fourth lens 4 on the optical axis, TTL is a total length of the lens assembly, R4 is a radius of curvature of an image side surface of the Aspheric surfaces of the first lens 1, the second lens 2, the third lens 3 and the fourth lens 4 meet the following formula:

$$z = \frac{cr^2}{1 + \sqrt{1 - (1+k)c^2 r^2}} + \alpha_1 r^2 + \alpha_2 r^4 + \alpha_3 r^6 + \alpha_4 r^8 + \alpha_5 r^{10} + \alpha_6 r^{12} + \alpha_7 r^{14} + \alpha_8 r^{16},$$

where, z represents a z-axis coordinate value of any point on a lens surface, r represents a y-axis coordinate value of the point on the lens surface, c represents a reciprocal of a radius of curvature, R, of the lens surface, k is a cone coefficient, and $\alpha_1$, $\alpha_2$, $\alpha_3$, $\alpha_4$, $\alpha_5$, $\alpha_6$, $\alpha_7$ and $\alpha_8$ are high order aspherical coefficients.

The lens assembly may be further configured based on specific values of the parameters in the above formula, and the exemplary values are as shown in Table 2 (F=2.48 mm, FNO=2.0 and FOV=84°).

TABLE 2

Table of lens parameters of the lens assembly

| | The first lens 1 | | The second lens 2 | | The third lens 3 | | The fourth lens 4 | |
|---|---|---|---|---|---|---|---|---|
| | Surface sequence number | | | | | | | |
| | 11 | 12 | 21 | 22 | 31 | 32 | 41 | 42 |
| R (mm) | 2.66E+00 | −2.94E+00 | −9.01E+00 | 3.92E+00 | −2.17E+00 | −6.12E−01 | 1.78E+00 | 5.54E−01 |
| k | −1.36E+01 | 7.86E+00 | −6.17E+01 | 5.23E+01 | −1.12E+01 | −3.47E+00 | −3.82E−01 | −4.23E+00 |
| $\alpha_2$ | −4.53E−02 | −2.94E−01 | −6.63E−01 | −2.99E−01 | 6.44E−02 | −3.32E−01 | −2.68E−01 | −1.08E−01 |
| $\alpha_3$ | −1.09E−02 | −6.80E−02 | 9.94E−01 | 3.68E−02 | −1.77E−01 | 3.73E−01 | 1.08E−01 | 5.29E−02 |
| $\alpha_4$ | −6.25E−01 | 5.49E−01 | 7.86E−01 | 2.92E−01 | −1.36E−02 | −3.16E−01 | −2.94E−02 | −1.99E−02 |
| $\alpha_5$ | 2.05E−01 | −6.85E−01 | 3.17E−01 | −1.03E−01 | 1.83E−01 | 1.31E−01 | −9.16E−04 | 3.68E−03 |
| $\alpha_6$ | 2.27E+00 | −5.87E−01 | −7.13E−01 | −4.20E−01 | −4.64E−02 | 4.16E−02 | 2.92E−03 | −5.18E−05 |
| $\alpha_7$ | −7.83E+00 | 3.13E+00 | −2.58E−01 | 6.27E−01 | 4.55E−02 | −6.74E−03 | −6.61E−04 | −9.61E−05 |
| $\alpha_8$ | 9.11E+00 | −2.67E+00 | 2.34E−01 | −2.96E−01 | −9.19E−02 | −1.22E−02 | 1.90E−05 | 1.07E−05 |

Figure 5:
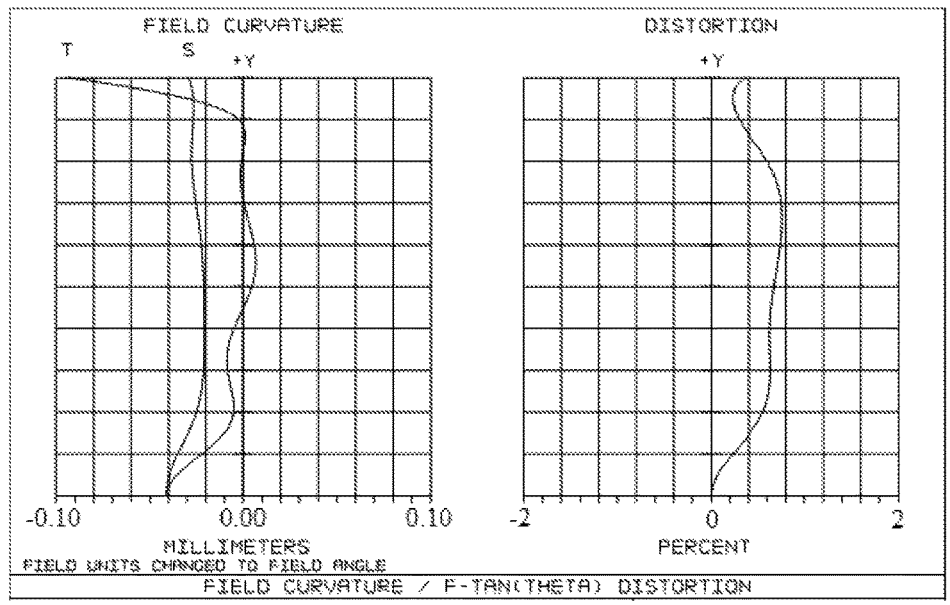
FIG. 5 shows field curvature curves and a distortion curve of the ultra-wide-angle and large-aperture optical lens assembly with high image quality according to the second embodiment of the present disclosure.
Figure 6:
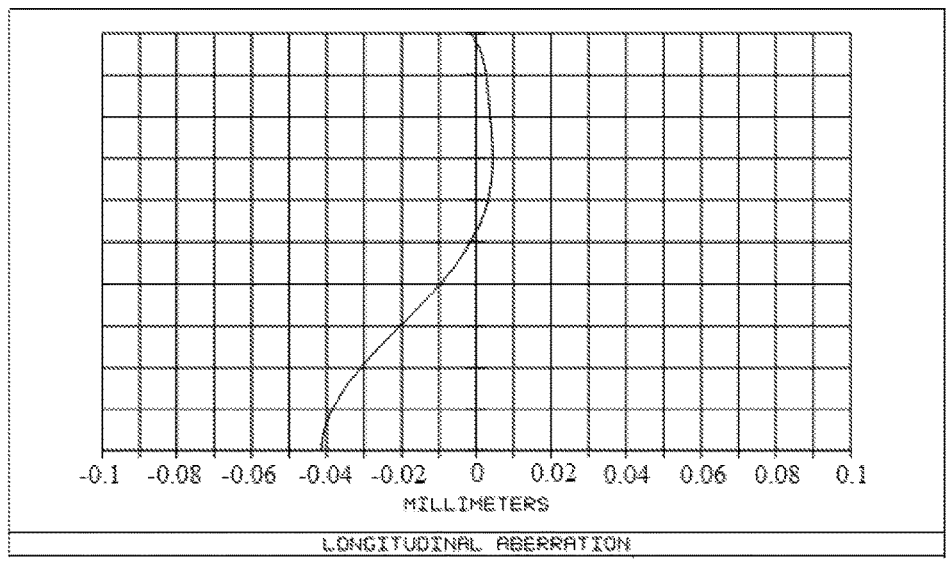
FIG. 6 shows a spherical aberration curve of the ultra-wide-angle and large-aperture optical lens assembly with high image quality according to the second embodiment of the present disclosure.

Based on the above parameters, the field curvature curve and distortion curve of the lens assembly are as shown in FIG. 5, and a spherical aberration curve of the lens assembly is as shown in FIG. 6. It can be seen from FIG. 5 that an optical distortion of the lens assembly is less than 2% and a field curvature of the lens assembly is less than 0.1 mm. Thus, a captured picture has low image distortion and high definition. It can be seen from FIG. 6 that the spherical aberration of the lens assembly is less than 0.1 mm.

Third Embodiment

Figure 7:
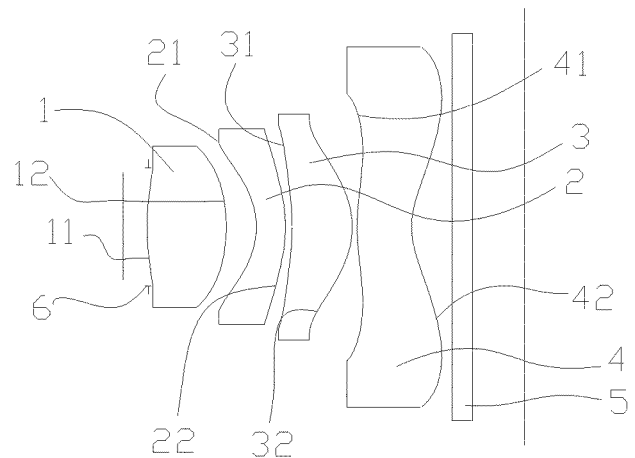
FIG. 7 is a schematic structural diagram of an ultra-wide-angle and large-aperture optical lens assembly with high image quality according to a third embodiment of the present disclosure.

Reference is made to FIG. 7. The third embodiment differs from the first embodiment in that, in the ultra-wide-angle and large-aperture optical lens assembly with high image quality, the lens assembly, the first lens 1, the second lens 2, the third lens 3 and the fourth lens 4 meet the following relational expressions:

$$0.9 < TTL/f1 < 2.5,\ 0.5 < f/|f4| < 1.6,\ 0.4 < D4/D1 < 0.9\ \text{and}\ 1.5 < n1 < 1.6 < n2 < 1.7.$$

In the relational expressions, f is a focal length of the lens assembly, f1 is a focal length of the first lens 1, f4 is a focal length of the fourth lens 4, D1 is a thickness of the first lens 1 on an optical axis, D4 is a thickness of the fourth lens 4 on the optical axis, TTL is a total length of the lens assembly, n1 is a refractive index of the first lens 1 and n2 is a refractive index of the second lens 2.

In the embodiment, the central thickness of the first lens 1 ranges from 0.735 mm to 0.945 mm, the central thickness of the second lens 2 ranges from 0.256 mm to 0.484 mm, the central thickness of the third lens 3 ranges from 0.612 mm to 0.833 mm and the central thickness of the fourth lens 4 ranges from 0.486 mm to 0.615 mm.

Aspheric surfaces of the first lens 1, the second lens 2, the third lens 3 and the fourth lens 4 meet the following formula:

$$z = \frac{cr^2}{1 + \sqrt{1 - (1+k)c^2 r^2}} + \alpha_1 r^2 + \alpha_2 r^4 + \alpha_3 r^6 + \alpha_4 r^8 + \alpha_5 r^{10} + \alpha_6 r^{12} + \alpha_7 r^{14} + \alpha_8 r^{16},$$

where, z represents a z-axis coordinate value of any point on a lens surface, r represents a y-axis coordinate value of the point on the lens surface, c represents a reciprocal of a radius of curvature, R, of the lens surface, k is a cone coefficient, and $\alpha_1$, $\alpha_2$, $\alpha_3$, $\alpha_4$, $\alpha_5$, $\alpha_6$, $\alpha_7$ and $\alpha_8$ are high order aspherical coefficients.

The lens assembly may be further configured based on specific values of the parameters in the above formula, and the exemplary values are as shown in Table 3 (F=2.50 mm, FNO=2.0 and FOV=84°).

Figure 8:
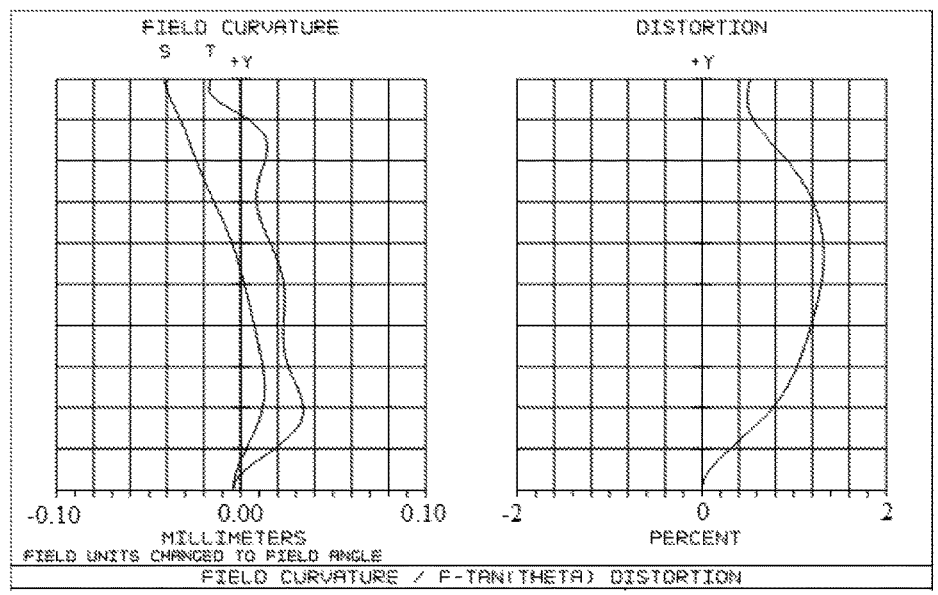
FIG. 8 shows field curvature curves and a distortion curve of the ultra-wide-angle and large-aperture optical lens assembly with high image quality according to the third embodiment of the present disclosure.
Figure 9:
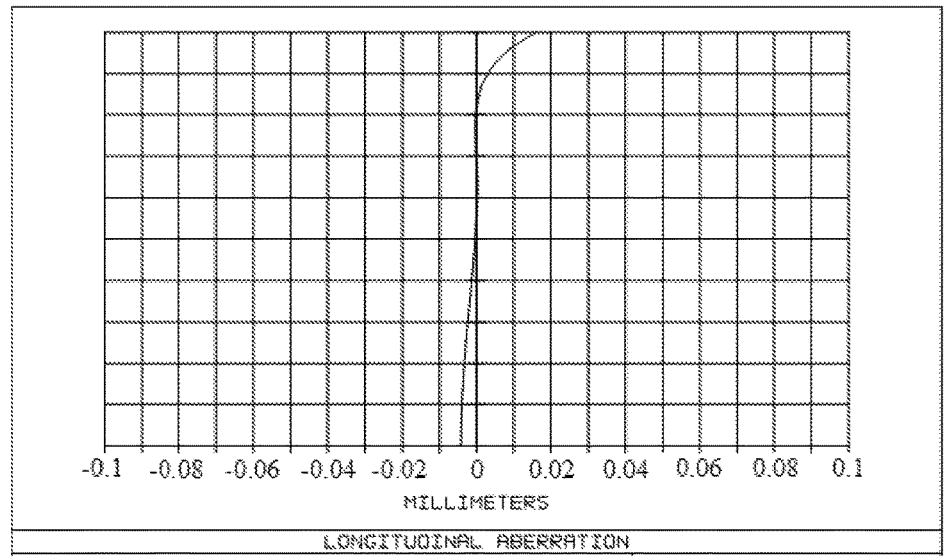
FIG. 9 shows a spherical aberration curve of the ultra-wide-angle and large-aperture optical lens assembly with high image quality according to the third embodiment of the present disclosure.

Based on the above parameters, the field curvature curve and distortion curve of the lens assembly are as shown in FIG. 8, and a spherical aberration curve of the lens assembly is as shown in FIG. 9. It can be seen from FIG. 8 that an optical distortion of the lens assembly is less than 2% and a field curvature of the lens assembly is less than 0.1 mm. Thus, a captured picture has low image distortion and high definition. It can be seen from FIG. 9 that the spherical aberration of the lens assembly is less than 0.1 mm.

Fourth Embodiment

Figure 10:
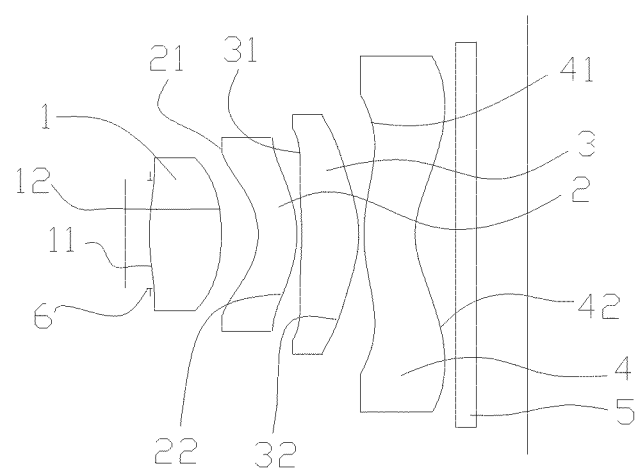
FIG. 10 is a schematic structural diagram of an ultra-wide-angle and large-aperture optical lens assembly with high image quality according to a fourth embodiment of the present disclosure.

Reference is made to FIG. 10. The fourth embodiment differs from the first embodiment in that, in the ultra-wide-angle and large-aperture optical lens assembly with high image quality, the lens assembly, the first lens 1, the second lens 2, the third lens 3 and the fourth lens 4 meet the following relational expressions: $0.9 < TTL/f1 < 2.5$, $0.5 < f/|f4| < 1.6$, $0.4 < D4/D1 < 0.9$, $1.5 < n1 < 1.6 < n2 < 1.7$ and $(Vd1+Vd3)/(Vd2+Vd4) > 2$.

In the relational expressions, f is a focal length of the lens assembly, f1 is a focal length of the first lens 1, f4 is a focal length of the fourth lens 4, D1 is a thickness of the first lens 1 on an optical axis, D4 is a thickness of the fourth lens 4 on the optical axis, TTL is a total length of the lens assembly, n1 is a refractive index of the first lens 1, n2 is a refractive index of the second lens 2 and Vdn is an Abbe number of an n-th lens.

In the embodiment, the central thickness of the first lens 1 ranges from 0.621 mm to 0.848 mm, the central thickness of the second lens 2 ranges from 0.386 mm to 0.512 mm, the central thickness of the third lens 3 ranges from 0.538 mm to 0.769 mm and the central thickness of the fourth lens 4 ranges from 0.402 mm to 0.643 mm.

Moreover, aspheric surfaces of the first lens 1, the second lens 2, the third lens 3 and the fourth lens 4 meet the following formula:

$$z = \frac{cr^2}{1 + \sqrt{1 - (1+k)c^2 r^2}} + \alpha_1 r^2 + \alpha_2 r^4 + \alpha_3 r^6 + \alpha_4 r^8 + \alpha_5 r^{10} + \alpha_6 r^{12} + \alpha_7 r^{14} + \alpha_8 r^{16},$$

where, z represents a z-axis coordinate value of any point on a lens surface, r represents a y-axis coordinate value of the point of the lens surface, c represents a reciprocal of a radius of curvature, R, of the lens surface, k is a cone coefficient, and $\alpha_1$, $\alpha_2$, $\alpha_3$, $\alpha_4$, $\alpha_5$, $\alpha_6$, $\alpha_7$ and $\alpha_8$ are high order aspherical coefficients.

The lens assembly may be further configured based on specific values of the parameters in the above formula, and the exemplary values are as shown in Table 4 (F=2.50 mm, FNO=2.0 and FOV=84°).

TABLE 3

Table of lens parameters of the lens assembly

| | The first lens 1 | | The second lens 2 | | The third lens 3 | | The fourth lens 4 | |
|---|---|---|---|---|---|---|---|---|
| | Surface sequence number | | | | | | | |
| | 11 | 12 | 21 | 22 | 31 | 32 | 41 | 42 |
| R (mm) | 2.53E+00 | −1.79E+00 | −8.10E−01 | −1.50E+00 | −2.40E+00 | −8.52E−01 | 2.06E+00 | 8.14E−01 |
| k | −6.78E+00 | 0.00E+00 | −2.68E−01 | −1.92E+00 | 0 | −9.32E−01 | −3.01E+01 | −4.40E+00 |
| $\alpha_2$ | −1.70E−02 | −1.93E−01 | 8.44E−02 | 1.54E−01 | 2.33E−01 | 1.54E−01 | −5.45E−02 | −1.30E−01 |
| $\alpha_3$ | −2.20E−01 | −2.76E−02 | 3.43E−01 | 1.03E−01 | −1.80E−01 | −3.04E−02 | −1.42E−01 | 6.72E−02 |
| $\alpha_4$ | 3.27E−01 | 3.48E−01 | 7.02E−01 | −3.66E−01 | 4.51E−02 | −2.28E−02 | 2.02E−01 | −2.45E−02 |
| $\alpha_5$ | −7.14E−01 | −8.41E−01 | −1.62E+00 | 1.68E−01 | −2.02E−03 | 1.46E−01 | −1.04E−01 | 4.03E−03 |
| $\alpha_6$ | −2.72E−01 | 5.35E−01 | 1.38E+00 | 3.27E−02 | −7.06E−04 | −6.84E−02 | −2.16E−03 | −8.10E−05 |
| $\alpha_7$ | 0 | 0 | 0 | 0 | 0 | 0 | 2.18E−02 | −2.63E−05 |
| $\alpha_8$ | 0 | 0 | 0 | 0 | 0 | 0 | −5.95E−03 | −4.89E−06 |

TABLE 4

Table of lens parameters of the lens assembly

| | The first lens 1 | | The second lens 2 | | The third lens 3 | | The fourth lens 4 | |
|---|---|---|---|---|---|---|---|---|
| | Surface sequence number | | | | | | | |
| | 11 | 12 | 21 | 22 | 31 | 32 | 41 | 42 |
| R (mm) | 2.52E+00 | −1.90E+00 | −7.62E−01 | −1.21E+00 | −3.59E+00 | −1.15E+00 | 1.68E+00 | 8.66E−01 |
| k | −4.64E−01 | 4.63E−01 | −3.78E−01 | −6.54E−01 | −3.05E+01 | −3.41E+00 | −1.11E+01 | −4.45E+00 |
| $\alpha_2$ | −9.27E−02 | −2.06E−01 | −1.67E−01 | 4.88E−02 | 3.06E−01 | 1.40E−01 | −9.05E−03 | −8.86E−02 |
| $\alpha_3$ | −2.30E−01 | −2.72E−01 | 1.06E+00 | 2.28E−01 | −3.10E−01 | 1.04E−02 | −1.53E−01 | 1.23E−02 |
| $\alpha_4$ | 2.59E−01 | 1.01E+00 | 3.92E−01 | −1.60E−01 | 7.55E−04 | −1.47E−01 | 1.20E−01 | 3.53E−03 |
| $\alpha_5$ | −7.25E−02 | −1.66E+00 | −1.31E+00 | 1.16E−01 | 1.23E−01 | 8.02E−02 | −3.75E−02 | −1.54E−03 |
| $\alpha_6$ | −1.87E+00 | 1.22E+00 | 5.57E−01 | −2.47E−02 | −8.04E−02 | −1.74E−02 | −7.75E−03 | −2.43E−04 |
| $\alpha_7$ | −9.32E+00 | −4.81E−01 | 2.83E−01 | 1.67E−02 | −3.82E−04 | −3.35E−03 | 8.97E−03 | 1.79E−04 |
| $\alpha_8$ | 2.77E+01 | 1.71E−01 | −1.25E−02 | −3.60E−02 | 1.09E−02 | 4.39E−03 | −1.75E−03 | −2.22E−05 |

Figure 11:
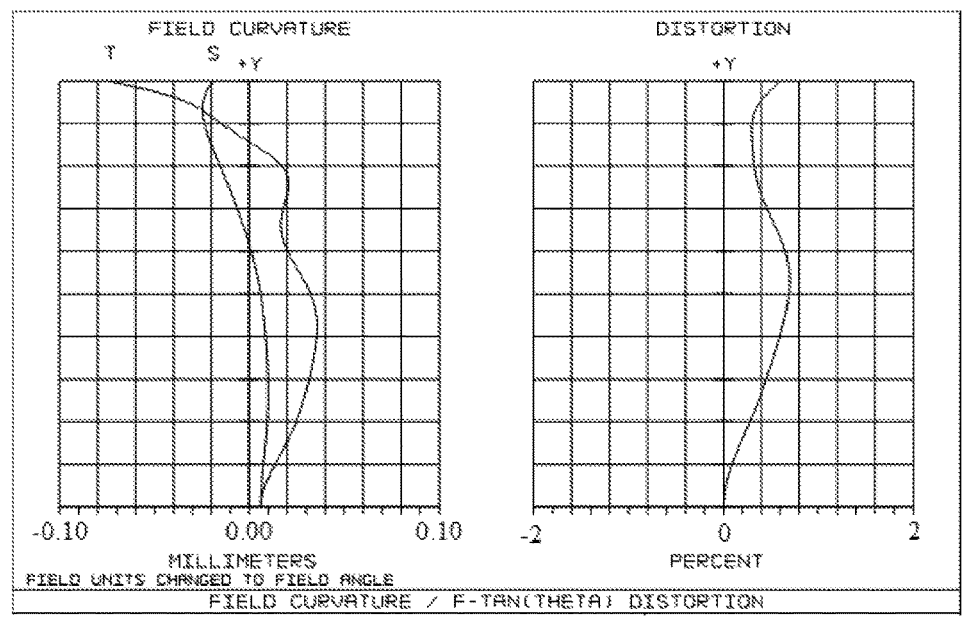
FIG. 11 shows field curvature curves and a distortion curve of the ultra-wide-angle and large-aperture optical lens assembly with high image quality according to the fourth embodiment of the present disclosure.
Figure 12:
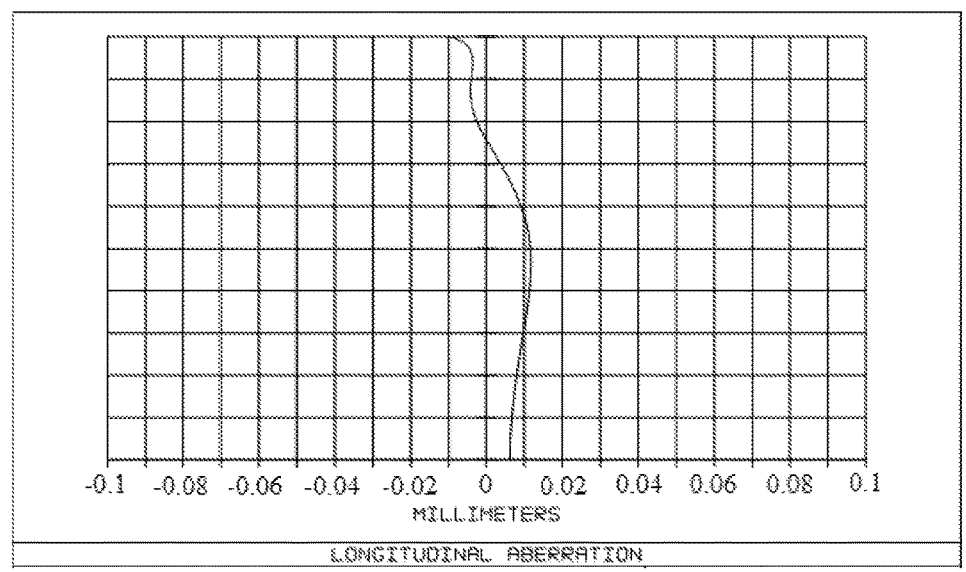
FIG. 12 shows a spherical aberration curve of the ultra-wide-angle and large-aperture optical lens assembly with high image quality according to the fourth embodiment of the present disclosure.

Based on the above parameters, the field curvature curve and distortion curve of the lens assembly are as shown in FIG. 11 and a spherical aberration curve of the lens assembly is as shown in FIG. 12. It can be seen from FIG. 11 that an optical distortion of the lens assembly is less than 2% and a field curvature of the lens assembly is less than 0.1 mm. Thus, a captured picture has low image distortion and high definition. It can be seen from FIG. 12 that the spherical aberration of the lens assembly is less than 0.1 mm.

Fifth Embodiment

Figure 13:
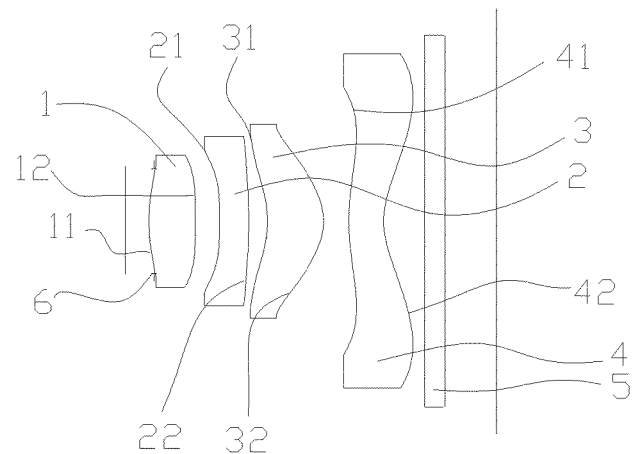
FIG. 13 is a schematic structural diagram of an ultra-wide-angle and large-aperture optical lens assembly with high image quality according to a fifth embodiment of the present disclosure.

Reference is made to FIG. 13. Differing from those in the fourth embodiment, a lens assembly, a first lens 1, a second lens 2, a third lens 3 and a fourth lens 4 in the fifth embodiment meet the following relational expressions: 0.9<TTL/f1<2.5, 0.5<f/|f4|<1.6, 0.4<D4/D1<0.9, 1.5<n1<1.6<n2<1.7 and (Vd1+Vd3)/(Vd2+Vd4)>2.

In the relational expressions, f is a focal length of the lens assembly, f1 is a focal length of the first lens 1, f4 is a focal length of the fourth lens 4, D1 is a thickness of the first lens 1 on an optical axis, D4 is a thickness of the fourth lens 4 on the optical axis, TTL is a total length of the lens assembly, n1 is a refractive index of the first lens 1, n2 is a refractive index of the second lens 2 and the Vdn is an Abbe number of an n-th lens.

The central thickness of the first lens 1 ranges from 0.451 mm to 0.648 mm, the central thickness of the second lens 2 ranges from 0.216 mm to 0.442 mm, the central thickness of the third lens 3 ranges from 0.538 mm to 0.769 mm and the central thickness of the fourth lens 4 ranges from 0.302 mm to 0.543 mm.

Aspheric surfaces of the first lens 1, the second lens 2, the third lens 3 and the fourth lens 4 meets the following formula:

$$z = \frac{cr^2}{1+\sqrt{1-(1+k)c^2r^2}} + \alpha_1 r^2 + \alpha_2 r^4 + \alpha_3 r^6 + \alpha_4 r^8 + \alpha_5 r^{10} + \alpha_6 r^{12} + \alpha_7 r^{14} + \alpha_8 r^{16},$$

where, z represents a z-axis coordinate value of any point on a lens surface, r represents a y-axis coordinate value of the point on the lens surface, c represents a reciprocal of a radius of curvature, R, of the lens surface, k is a cone coefficient, and $\alpha_1$, $\alpha_2$, $\alpha_3$, $\alpha_4$, $\alpha_5$, $\alpha_6$, $\alpha_7$ and $\alpha_8$ are high order aspherical coefficients.

The lens assembly may be further configured based on specific values of the parameters in the above formula, and the exemplary values are as shown in Table 5 (F=2.45 mm, FNO=2.0 and FOV=82°).

TABLE 5

Table of lens parameters of the lens assembly

| | The first lens 1 | | The second lens 2 | | The third lens 3 | | The fourth lens 4 | |
|---|---|---|---|---|---|---|---|---|
| | Surface sequence number | | | | | | | |
| | 11 | 12 | 21 | 22 | 31 | 32 | 41 | 42 |
| R (mm) | 1.89E+00 | −1.08E+01 | −5.46E+00 | −8.06E+00 | −1.14E+00 | −6.26E−01 | 2.74E+00 | 8.25E−01 |
| k | −8.42E+00 | −1.00E+00 | 2.47E+01 | 0 | −4.46E+00 | −2.51E+00 | −1.23E+01 | −5.52E+00 |
| $\alpha_2$ | 3.17E−02 | −2.89E−01 | −4.82E−01 | −5.17E−02 | −1.39E−01 | −2.44E−01 | 1.32E−02 | −4.24E−02 |
| $\alpha_3$ | −3.04E−03 | −2.51E−01 | 6.29E−01 | 1.68E−01 | 9.48E−01 | 3.56E−01 | −1.64E−01 | −2.73E−02 |
| $\alpha_4$ | −8.05E−01 | 1.07E−03 | −4.37E+00 | −1.81E−01 | −7.43E−01 | −4.41E−01 | 1.30E−01 | 2.29E−02 |
| $\alpha_5$ | 4.13E−01 | 2.20E−01 | 1.14E+01 | 3.57E−02 | −9.73E−01 | 5.84E−01 | −5.58E−02 | −8.58E−03 |
| $\alpha_6$ | 0 | 0 | −8.69E+00 | 6.16E−02 | 2.06E+00 | −3.22E−01 | 1.03E−02 | 1.44E−03 |
| $\alpha_7$ | 0 | 0 | −4.41E−01 | −2.36E−02 | −1.46E+00 | 3.90E−02 | 4.79E−04 | −6.10E−05 |
| $\alpha_8$ | 0 | 0 | 1.88E+00 | −8.47E−03 | 4.26E−01 | 3.10E−02 | −2.71E−04 | −6.15E−06 |

Figure 14:
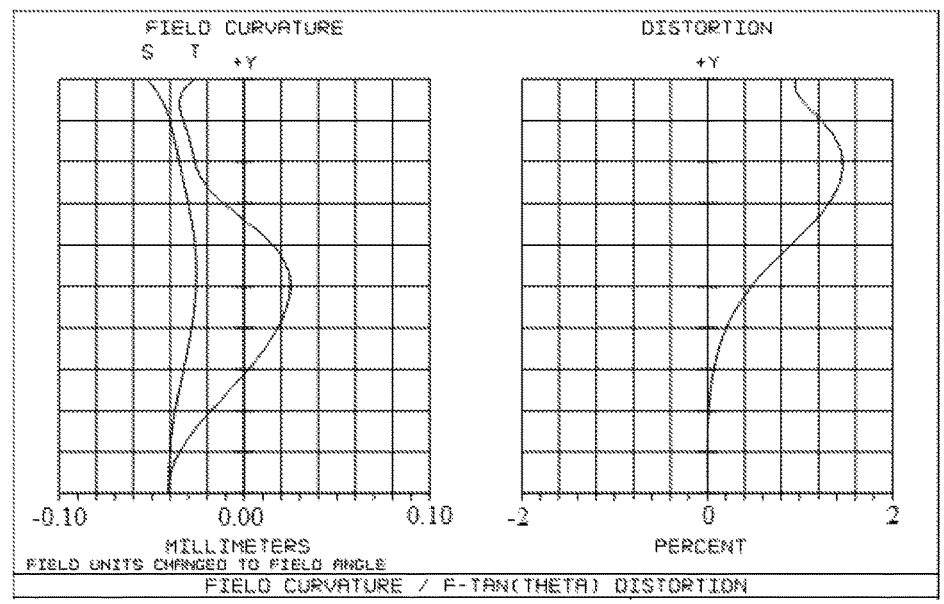
FIG. 14 shows field curvature curves and a distortion curve of the ultra-wide-angle and large-aperture optical lens assembly with high image quality according to the fifth embodiment of the present disclosure.
Figure 15:
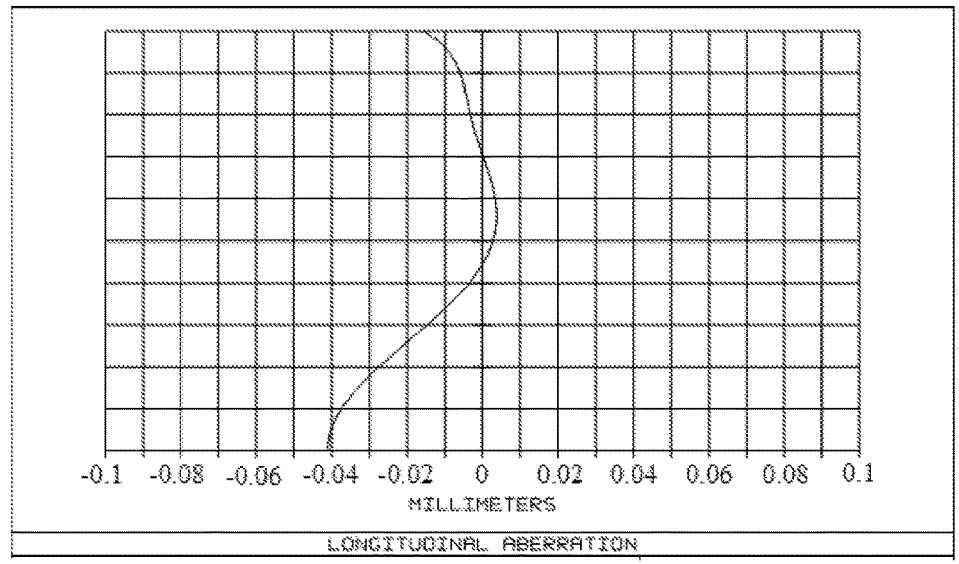
FIG. 15 shows a spherical aberration curve of the ultra-wide-angle and large-aperture optical lens assembly with high image quality according to the fifth embodiment of the present disclosure.

Based on the above parameters, the field curvature curve and distortion curve of the lens assembly are as shown in FIG. 14, and a spherical aberration curve of the lens assembly is as shown in FIG. 15. It can be seen from FIG. 14 that an optical distortion of the lens assembly is less than 2% and a field curvature of the lens assembly is less than 0.1 mm. Thus, a captured picture has low image distortion and high definition. It can be seen from FIG. 15 that the spherical aberration of the lens assembly is less than 0.1 mm.

Sixth Embodiment

Figure 16:
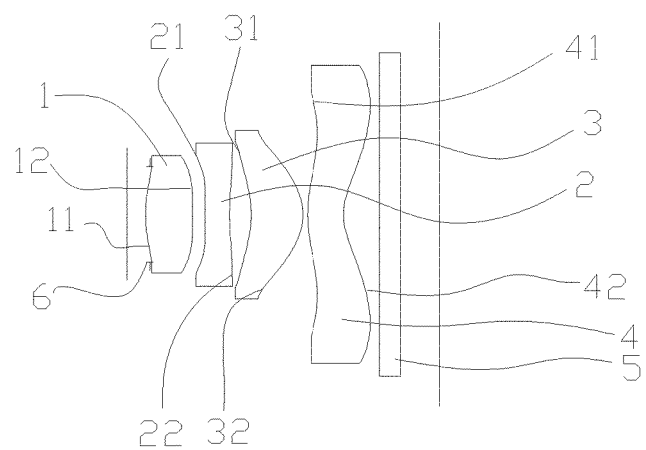
FIG. 16 is a schematic structural diagram of an ultra-wide-angle and large-aperture optical lens assembly with high image quality according to a sixth embodiment of the present disclosure.

Reference is made to FIG. 16. Differing from those in the first embodiment, a lens assembly, a first lens 1, a second lens 2, a third lens 3 and a fourth lens 4 in the sixth embodiment meet the following relational expressions:

0.9<TTL/f1<2.5, 0.5<f/|f4|<1.6, 0.4<D4/D1<0.9; −1.2<R4/f<−1.8; (Vd1+Vd3)/(Vd2+Vd4)>2; T12/T23<1 and 1.5<n1<1.6<n2<1.7.

In the relational expressions, f is a focal length of the lens assembly, f1 is a focal length of the first lens 1, f4 is a focal length of the fourth lens 4, D1 is a thickness of the first lens 1 on an optical axis, D4 is a thickness of the fourth lens 4 on the optical axis, TTL is a total length of the lens assembly, R4 is a radius of curvature of an image side surface of the second lens 2, T12 is a distance between the first lens 1 and the second lens 2 on the optical axis, T23 is a distance between the second lens 2 and the third lens 3 on the optical axis, n1 is a refractive index of the first lens 1, n2 is a refractive index of the second lens 2, and Vdn is an Abbe number of an n-th lens.

The central thickness of the first lens 1 ranges from 0.421 mm to 0.648 mm, the central thickness of the second lens 2 ranges from 0.203 mm to 0.412 mm, the central thickness of the third lens 3 ranges from 0.438 mm to 0.669 mm and the central thickness of the fourth lens 4 ranges from 0.356 mm to 0.543 mm.

In addition, aspheric surfaces of the first lens 1, second lens 2, third lens 3 and fourth lens 4 meet the following formula:

$$z = \frac{cr^2}{1+\sqrt{1-(1+k)c^2r^2}} + \alpha_1 r^2 + \alpha_2 r^4 + \alpha_3 r^6 + \alpha_4 r^8 + \alpha_5 r^{10} + \alpha_6 r^{12} + \alpha_7 r^{14} + \alpha_8 r^{16},$$

where, z represents a z-axis coordinate value of any point on a lens surface, r represents a y-axis coordinate value of the point on the lens surface, c represents a reciprocal of a radius of curvature, R, of the lens surface, k is a cone coefficient, and $\alpha_1$, $\alpha_2$, $\alpha_3$, $\alpha_4$, $\alpha_5$, $\alpha_6$, $\alpha_7$ and $\alpha_8$ are high order aspherical coefficients.

The lens assembly may be further configured based on specific values of the parameters in the above formula, and the exemplary values are as shown in Table 6 (F=2.0 mm, FNO=2.18 and FOV=89°).

Figure 17:
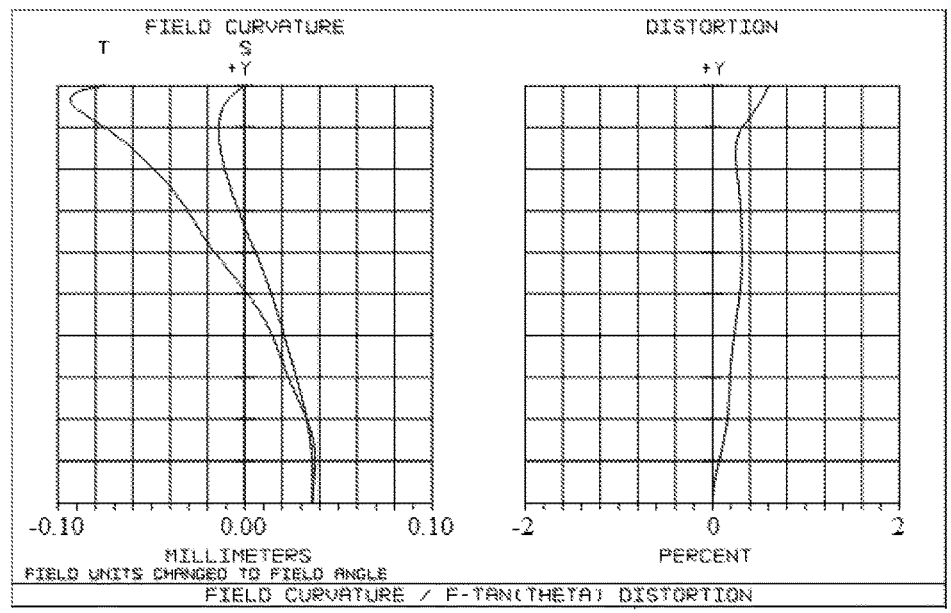
FIG. 17 shows field curvature curves and a distortion curve of the ultra-wide-angle and large-aperture optical lens assembly with high image quality according to the sixth embodiment of the present disclosure.
Figure 18:
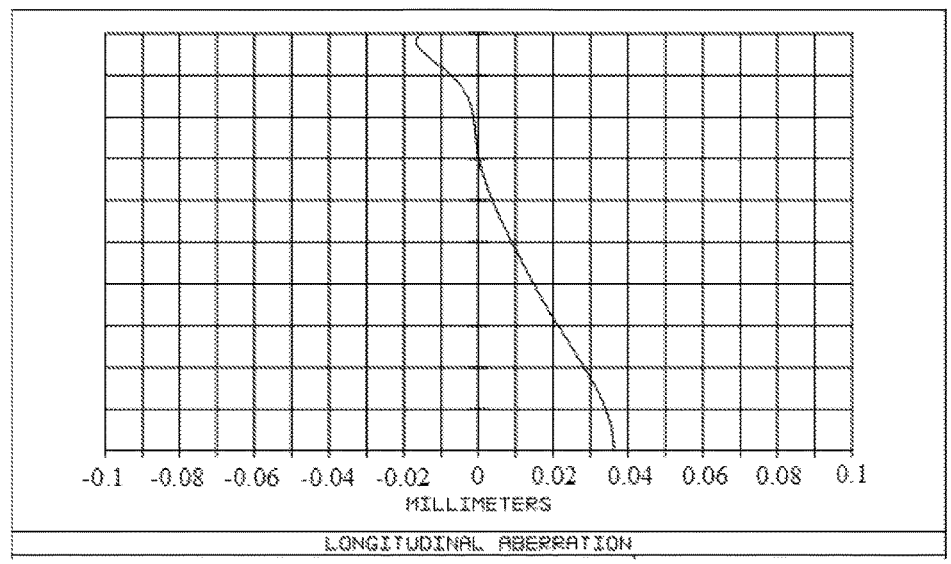
FIG. 18 shows a spherical aberration curve of the ultra-wide-angle and large-aperture optical lens assembly with high image quality according to the sixth embodiment of the present disclosure.

Based on the above parameters, the field curvature curve and distortion curve of the lens assembly are as shown in FIG. 17 and a spherical aberration curve of the lens assembly is as shown in FIG. 18. It can be seen from FIG. 17 that an optical distortion of the lens assembly is less than 2% and a field curvature of the lens assembly is less than 0.1 mm. Thus, a captured picture has low image distortion and high definition. It can be seen from FIG. 18 that the spherical aberration of the lens assembly is less than 0.1 mm.

Seventh Embodiment

Figure 19:
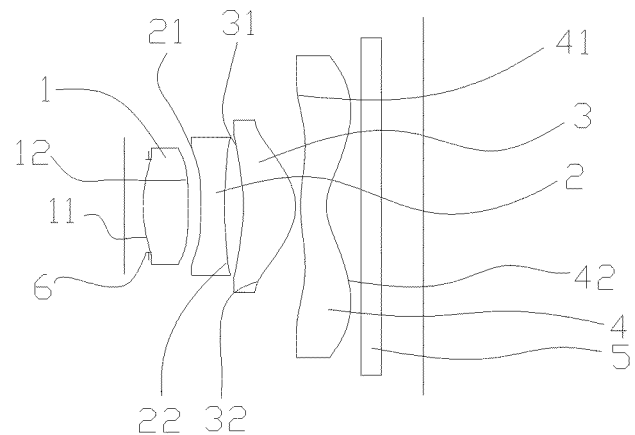
FIG. 19 is a schematic structural diagram of an ultra-wide-angle and large-aperture optical lens assembly with high image quality according to a seventh embodiment of the present disclosure.

Reference is made to FIG. 19. The seventh embodiment differs from the first embodiment in that, in the ultra-wide-angle and large-aperture optical lens assembly with high image quality, the lens assembly, the first lens 1, the second lens 2, the third lens 3 and the fourth lens 4 meet the following relational expressions: 0.9<TTL/f1<2.5, 0.5<f/|f4|<1.6, 0.4<D4/D1<0.9, −1.2<R4/f<−1.8, T12/T23<1 and 1.5<n1<1.6<n2<1.7.

In the relational expressions, f is a focal length of the lens assembly, f1 is a focal length of the first lens 1, f4 is a focal length of the fourth lens 4, D1 is a thickness of the first lens 1 on an optical axis, D4 is a thickness of the fourth lens 4 on the optical axis, TTL is a total length of the lens assembly, R4 is a radius of curvature of an image side surface of the second lens 2, n1 is a refractive index of the first lens 1, n2 is a refractive index of the second lens 2, T12 is a distance between the first lens 1 and the second lens 2 on the optical axis, and T23 is a distance between the second lens 2 and the third lens 3 on the optical axis.

In the embodiment, the central thickness of the first lens 1 ranges from 0.321 mm to 0.548 mm, the central thickness of the second lens 2 ranges from 0.186 mm to 0.312 mm, the central thickness of the third lens 3 ranges from 0.538 mm to 0.769 mm, the central thickness of the fourth lens 4 ranges from 0.202 mm to 0.443 mm.

In addition, aspheric surfaces of the first lens 1, second lens 2, third lens 3 and fourth lens 4 meet the following formula:

$$z = \frac{cr^2}{1+\sqrt{1-(1+k)c^2r^2}} + \alpha_1 r^2 + \alpha_2 r^4 + \alpha_3 r^6 + \alpha_4 r^8 + \alpha_5 r^{10} + \alpha_6 r^{12} + \alpha_7 r^{14} + \alpha_8 r^{16},$$

where, z represents a z-axis coordinate value of any point on a lens surface, r represents a y-axis coordinate value of the point on the lens surface, c represents a reciprocal of a radius of curvature, R, of the lens surface, k is a cone coefficient, and $\alpha_1$, $\alpha_2$, $\alpha_3$, $\alpha_4$, $\alpha_5$, $\alpha_6$, $\alpha_7$ and $\alpha_8$ are high order aspherical coefficients.

The lens assembly may be further configured based on specific values of the parameters in the above formula, and exemplary values are as shown in Table 7 (F=2.03 mm, FNO=2.0 and FOV=87°)

TABLE 6

Table of lens parameters of the lens assembly

| | The first lens 1 | | The second lens 2 | | The third lens 3 | | The fourth lens 4 | |
|---|---|---|---|---|---|---|---|---|
| | Surface sequence number | | | | | | | |
| | 11 | 12 | 21 | 22 | 31 | 32 | 41 | 42 |
| R (mm) | 1.57E+00 | −3.75E+01 | 4.84E+00 | 3.02E+00 | −1.14E+00 | −5.57E−01 | 1.27E+00 | 5.83E−01 |
| k | 3.55E+00 | 0 | 5.08E+01 | 0 | −6.20E+00 | −3.00E+00 | −2.34E−01 | −4.55E+00 |
| $\alpha_2$ | −2.06E−01 | −9.64E−01 | −1.00E+00 | −1.07E−01 | 8.17E−02 | −6.19E−01 | −5.89E−01 | −2.22E−01 |
| $\alpha_3$ | −1.49E+00 | 2.60E+00 | −2.21E+00 | −1.27E+00 | −6.11E−02 | 1.08E+00 | 3.51E−01 | 1.55E−01 |
| $\alpha_4$ | 1.37E+01 | −8.12E−01 | 3.31E+00 | 2.58E+00 | 2.37E−01 | −1.86E+00 | −1.42E−01 | −8.31E−02 |
| $\alpha_5$ | −7.69E+01 | −2.99E+00 | 7.68E+00 | 4.06E+00 | 8.32E−01 | 1.80E+00 | 2.77E−04 | 2.62E−02 |
| $\alpha_6$ | 3.70E+01 | 2.41E+01 | 7.28E+00 | −1.94E+01 | −3.14E+00 | 1.52E+00 | 1.73E−02 | −4.62E−03 |
| $\alpha_7$ | 9.42E+02 | −1.01E+01 | −1.03E+01 | 2.24E+01 | 2.43E+00 | −2.62E+00 | −7.27E−04 | 5.26E−04 |
| $\alpha_8$ | −2.26E+03 | −3.43E+01 | −4.40E+01 | −7.03E+00 | −1.52E+00 | 7.32E−01 | −2.11E−03 | −7.57E−05 |

TABLE 7

Table of lens parameters of the lens assembly

| | The first lens 1 | | The second lens 2 | | The third lens 3 | | The fourth lens 4 | |
|---|---|---|---|---|---|---|---|---|
| | Surface sequence number | | | | | | | |
| | 11 | 12 | 21 | 22 | 31 | 32 | 41 | 42 |
| R (mm) | 1.89E+00 | −1.08E+01 | −5.46E+00 | −8.06E+00 | −1.14E+00 | −6.26E−01 | 2.74E+00 | 8.25E−01 |
| k | −8.42E+00 | −1.00E+00 | 2.47E+01 | 0.00E+00 | −4.46E+00 | −2.51E+00 | −1.23E+01 | −5.52E+00 |
| $\alpha_2$ | 3.17E−02 | −2.89E−01 | −4.82E−01 | −5.17E−02 | −1.39E−01 | −2.44E−01 | 1.32E−02 | −4.24E−02 |
| $\alpha_3$ | −3.04E−03 | −2.51E−01 | 6.29E−01 | 1.68E−01 | 9.48E−01 | 3.56E−01 | −1.64E−01 | −2.73E−02 |
| $\alpha_4$ | −8.05E−01 | 1.07E−03 | −4.37E+00 | −1.81E−01 | −7.43E−01 | −4.41E−01 | 1.30E−01 | 2.29E−02 |
| $\alpha_5$ | 4.13E−01 | 2.20E−01 | 1.14E+01 | 3.57E−02 | −9.73E−01 | 5.84E−01 | −5.58E−02 | −8.58E−03 |
| $\alpha_6$ | 0 | 0 | −8.69E+00 | 6.16E−02 | 2.06E+00 | −3.22E−01 | 1.03E−02 | 1.44E−03 |
| $\alpha_7$ | 0 | 0 | −4.41E−01 | −2.36E−02 | −1.46E+00 | 3.90E−02 | 4.79E−04 | −6.10E−05 |
| $\alpha_8$ | 0 | 0 | 1.88E+00 | −8.47E−03 | 4.26E−01 | 3.10E−02 | −2.71E−04 | −6.15E−06 |

Figure 20:
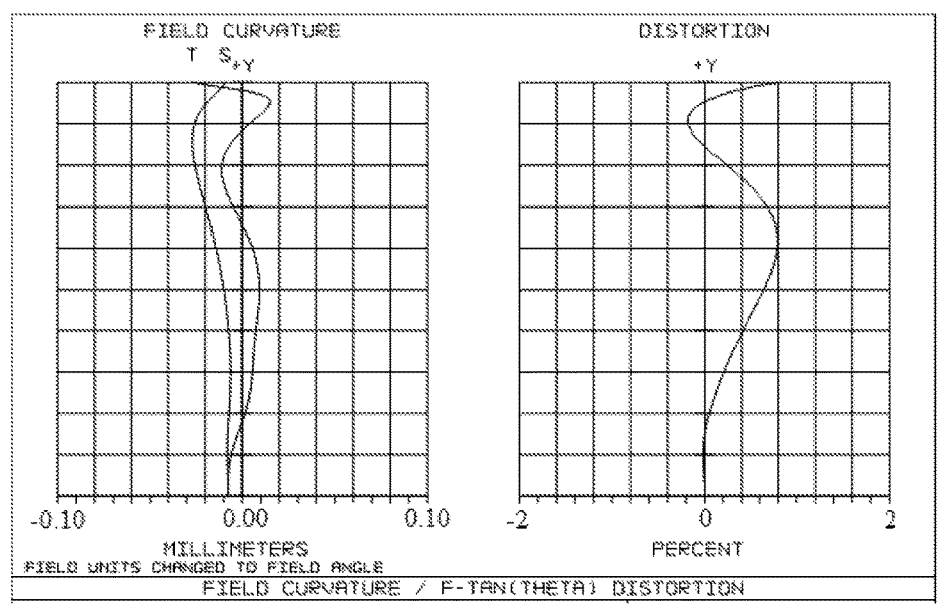
FIG. 20 shows field curvature curves and a distortion curve of the ultra-wide-angle and large-aperture optical lens assembly with high image quality according to the seventh embodiment of the present disclosure.
Figure 21:
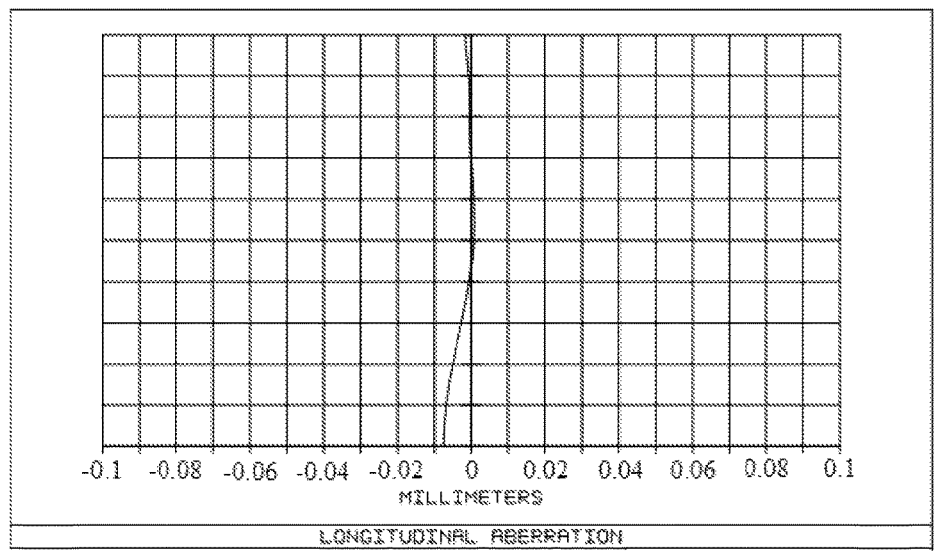
FIG. 21 shows a spherical aberration curve of the ultra-wide-angle and large-aperture optical lens assembly with high image quality according to the seventh embodiment of the present disclosure.

Based on the above values of the parameters, the field curvature curve and distortion curve of the lens assembly are as shown in FIG. 20, and a spherical aberration curve of the lens assembly is as shown in FIG. 21. It can be seen from FIG. 20 that an optical distortion of the lens assembly is less than 2% and a field curvature of the lens assembly is less than 0.1 mm. Thus, a captured picture has low image distortion and high definition. It can be seen from FIG. 21 that the spherical aberration of the lens assembly is less than 0.1 mm.

Only a few embodiments of the present disclosure are described in the above specifically and in detail, but the scope of the present disclosure is not limited thereto. It should be noted that various deformations and modifications may be made to the present disclosure by those skilled in the art without departing from the spirit and scope of the present disclosure, and these deformations and modifications all fall within the scope of the present disclosure. Therefore, the scope of the present disclosure is defined by the appending claims.

The invention claimed is:

1. An optical lens assembly, comprising:
   a first lens, a second lens, a third lens, a fourth lens, and a filter which are arranged sequentially from an object side to an image side, and
   a diaphragm arranged between the second lens and the object side, wherein:
   the first lens has a positive focal power and comprises a convex surface facing toward the image side;
   the second lens has a negative focal power and comprises a concave surface facing toward the object side;
   the third lens has a positive focal power;
   the fourth lens has a negative focal power and has an object side surface and an image side surface both being aspheric surfaces, the object side surface of the fourth lens is arranged with an inflexion point;
   the lens assembly meets the following relational expressions:

$0.9 < TTL/f1 < 2.5$, $0.5 < f/|f4| < 1.6$, and $0.4 < D4/D1 < 0.9$, where, f is a focal length of the lens assembly, f1 is a focal length of the first lens, f4 is a focal length of the fourth lens, D1 is a thickness of the first lens on an optical axis, D4 is a thickness of the fourth lens on the optical axis, and TTL is a total length of the lens assembly; and
   Abbe numbers Vdn of the first lens, the second lens, the third lens and the fourth lens meet the following relational expression: $(Vd1+Vd3)/(Vd2+Vd4) > 2$.

2. The optical lens assembly according to claim 1, wherein a radius of curvature, R4, of an image side surface of the second lens and the focal length f of the lens assembly meet the following relational expression: $-1.2 < R4/f < -1.8$.

3. The optical lens assembly according to claim 1, wherein a distance T12 between the first lens and the second lens on the optical axis and a distance T23 between the second lens and the third lens on the optical axis meet the following relational expression: $T12/T23 < 1$.

4. The optical lens assembly according to claim 1, wherein a refractive index n1 of the first lens and a refractive index n2 of the second lens meet the following relational expression: $1.5 < n1 < 1.6 < n2 < 1.7$.

5. An optical lens assembly, comprising:
   a first lens, a second lens, a third lens, a fourth lens, and a filter which are sequentially arranged from an object side to an image side, and
   a diaphragm arranged between the second lens and the object side, wherein:
   the first lens has a positive focal power and comprises a convex surface facing toward the image side;
   the second lens has a negative focal power and comprises a concave surface facing toward the object side;
   the third lens has a positive focal power;
   the fourth lens has a negative focal power and has an object side surface and an image side surface both being aspheric surfaces, each of the object side surface and the image side surface of the fourth lens is arranged with an inflexion point;
   the lens assembly meets the following relational expressions:

$0.9 < TTL/f1 < 2.5$, $0.5 < f/|f4| < 1.6$, and $0.4 < D4/D1 < 0.9$, where, f is a focal length of the lens assembly, f1 is a focal length of the first lens, f4 is a focal length of the fourth lens, D1 is a thickness of the first lens on an optical axis, D4 is a thickness of the fourth lens on the optical axis, and TTL is a total length of the lens assembly; and
   Abbe numbers Vdn of the first lens, the second lens, the third lens and the fourth lens meet the following relational expression: $(Vd1+Vd3)/(Vd2+Vd4) > 2$.

6. The optical lens assembly according to claim 5, wherein a radius of curvature, R4, of an image side surface of the second lens and the focal length f of the lens assembly meet the following relational expression: $-1.2 < R4/f < -1.8$.

7. The optical lens assembly according to claim 5, wherein a distance T12 between the first lens and the second lens on the optical axis and a distance T23 between the second lens and the third lens on the optical axis meet the following relational expression: T12/T23<1.

8. The optical lens assembly according to claim 5, wherein a refractive index n1 of the first lens and a refractive index n2 of the second lens meet the following relational expression: 1.5<n1<1.6<n2<1.7.

9. The optical lens assembly according to claim 2, wherein a distance T12 between the first lens and the second lens on the optical axis and a distance T23 between the second lens and the third lens on the optical axis meet the following relational expression: T12/T23<1.

10. The optical lens assembly according to claim 6, wherein a distance T12 between the first lens and the second lens on the optical axis and a distance T23 between the second lens and the third lens on the optical axis meet the following relational expression: T12/T23<1.

* * * * *